Oct. 26, 1965
A. H. WAKEMAN ETAL
3,214,147
FREEZER CONSTRUCTION
Filed Oct. 25, 1963
3 Sheets-Sheet 2
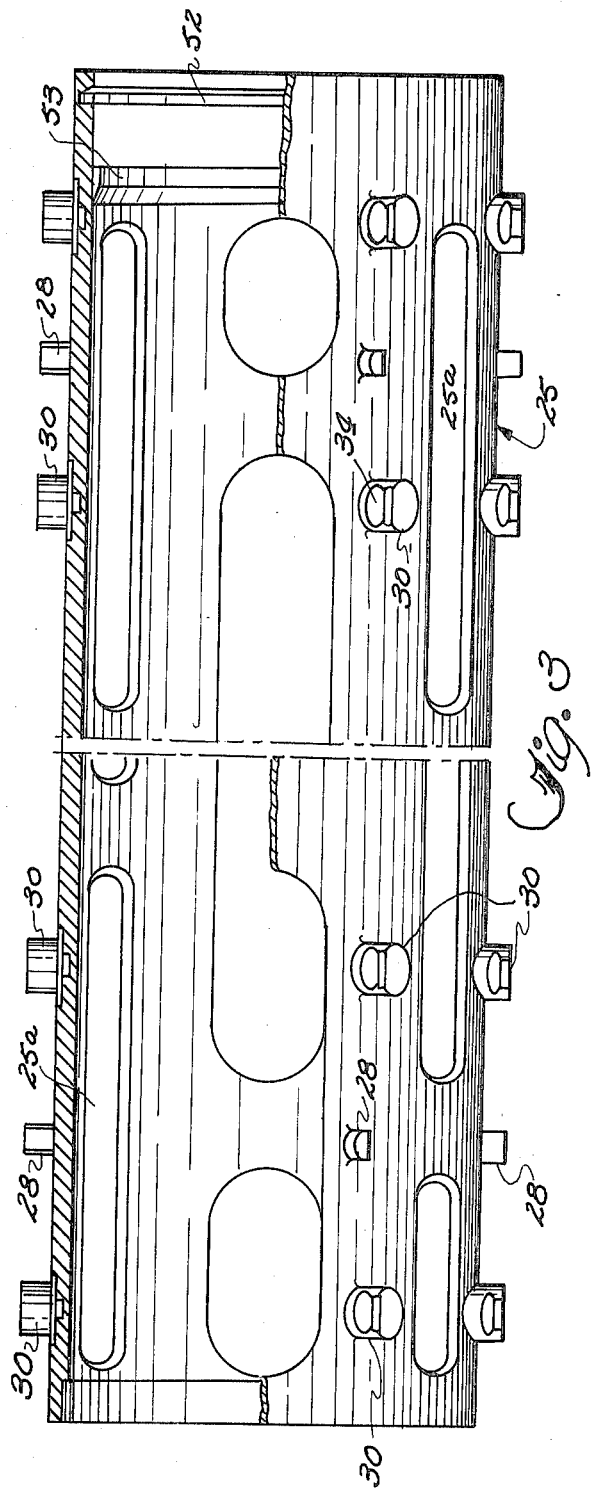
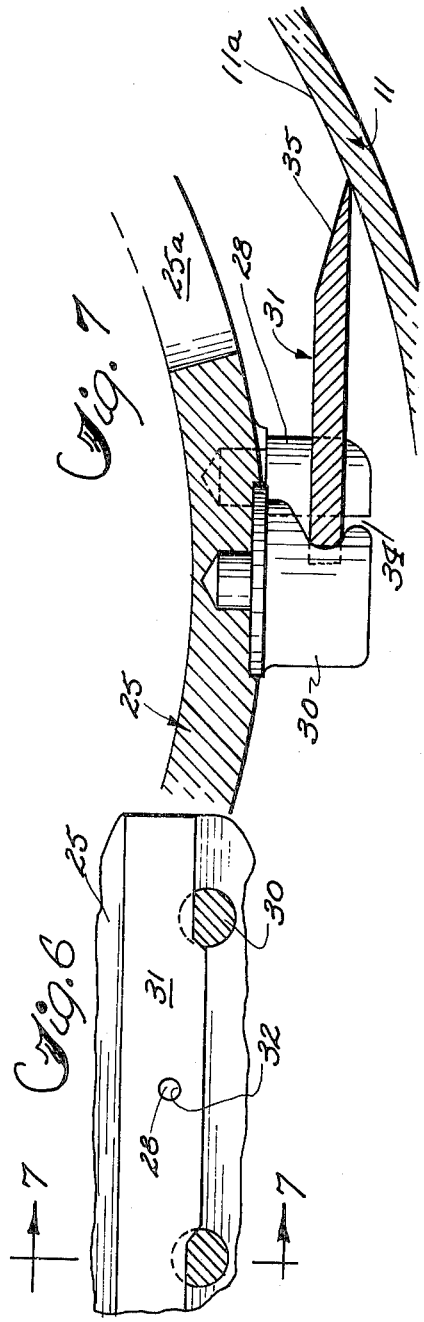
Inventors
Alder H. Wakeman
Dan G. Bohen
By Pendleton Neuman,
Seibold & Williams
Attorneys

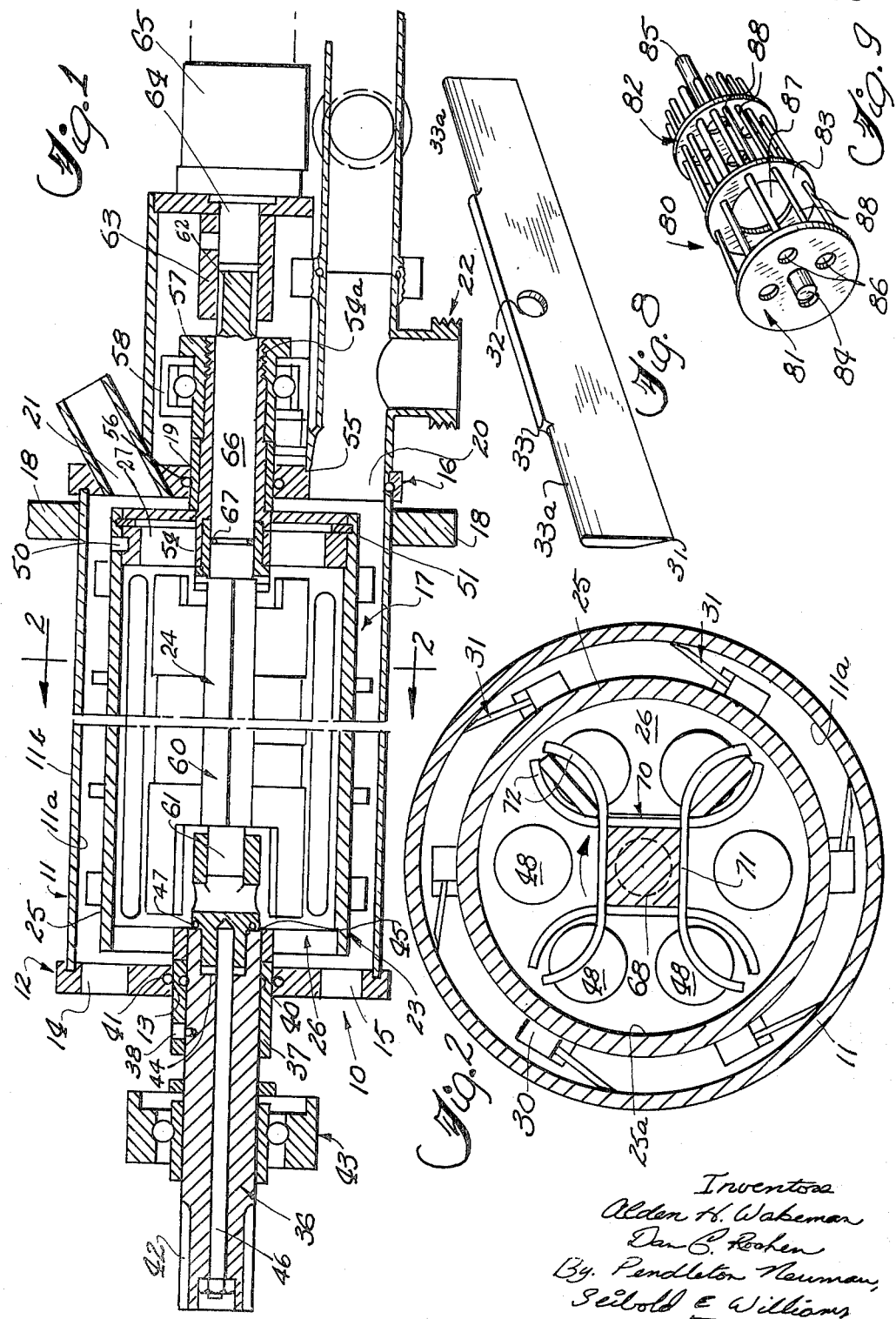

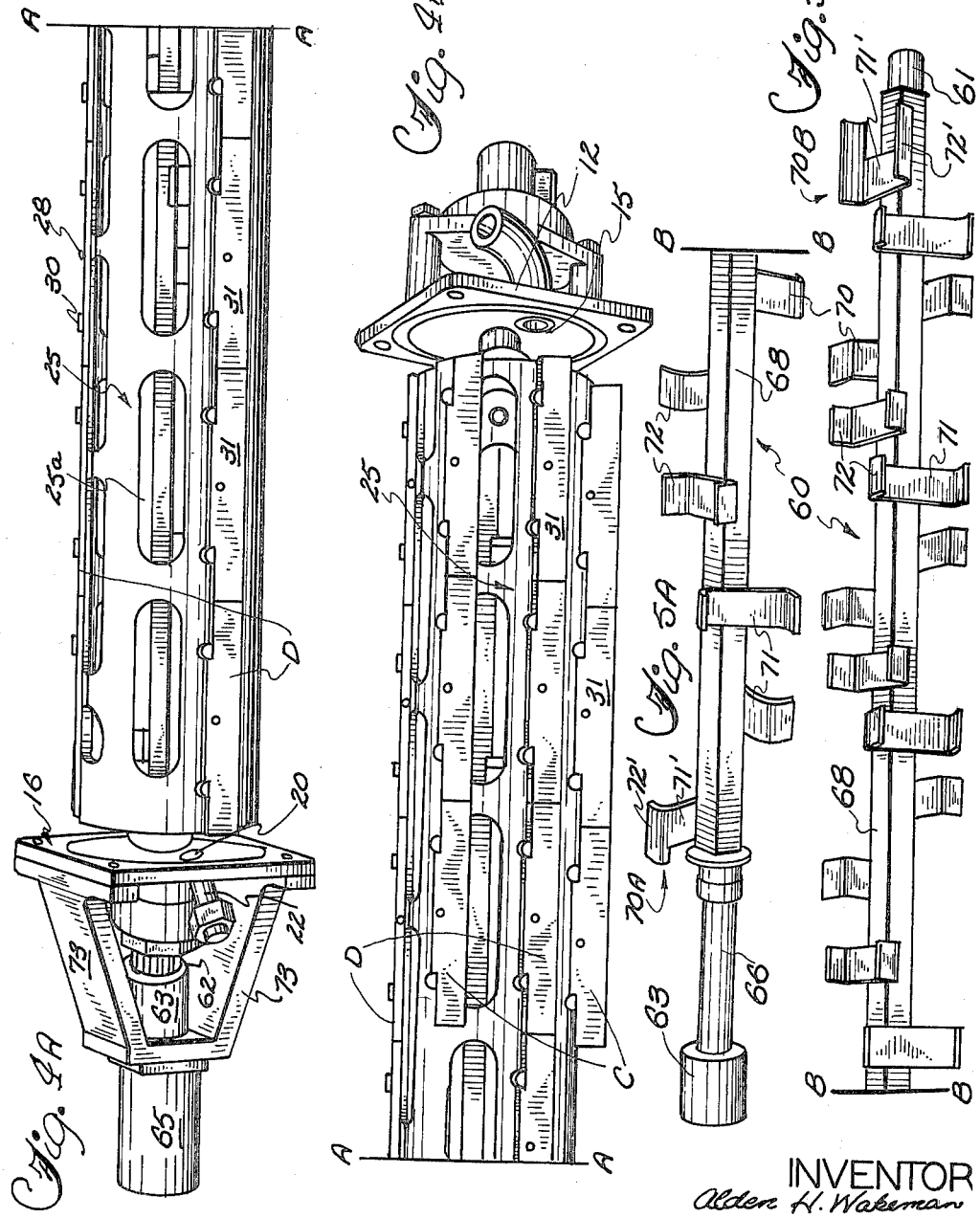

United States Patent Office 3,214,147
Patented Oct. 26, 1965

3,214,147
FREEZER CONSTRUCTION
Alden H. Wakeman, Lake Mills, and Dan C. Roahen, Fort Atkinson, Wis., assignors, by mesne assignments, to St. Regis Paper Company, New York, N.Y., a corporation of New York
Filed Oct. 25, 1963, Ser. No. 319,078
8 Claims. (Cl. 259—132)

This invention relates to a freezer construction particularly suitable for use in the commercial production of ice cream or the like and to the dasher-agitator assembly utilized in such a freezer.

In order for ice cream to attain optimum palatability and quality, it is necessary that a controlled amount of air be incorporated in the ice cream mix while the latter is being frozen. The term "overrun" as recognized in this particular art, denotes the percentage of air by volume in the finished product. In addition to controlled overrun being an important factor from the standpoint of quality, it is also important from the standpoint of cost per gallon of product. Various legal restrictions, however, as to the maximum overrun permitted are customarily imposed on products such as ice cream. It is obvious, therefore, that accurate overrun control is a matter of paramount concern.

To attain such overrun control, numerous factors must be considered such as the contents or ingredients constituting the mix itself prior to aerating thereof, the rate of freezing and flow of the product through the freezer chamber, the quantity of air introduced into the freezer chamber, the pressure maintained within the chamber, and the extent and vigor of the whipping action exerted on the product while passing through the chamber.

Many of these factors may be controlled with varying degrees of success through certain improvements in the refrigeration system for the freezer chamber, and in various controls associated with the product inlet or outlet for the freezer chamber. Such improvements, however, are not the subject of the instant invention.

The construction of the dasher-agitator assembly, sometimes referred to in the trade as a dasher-beater unit or merely the dasher, and its operation are of significant importance in attaining desired control of overrun. The whipping action imparted to the product will in large measure determine whether the texture of the product will be smooth, grainy, greasy, or salvy. Excessive whipping of the product may result in protein destabilization or the conversion of some of the product fat content into butter.

Many dasher-agitator assembly designs have heretofore been proposed in an attempt to attain accurate overrun control. Such assembly designs are beset with various shortcomings, such as for example, they are not suitable for use in freezers having a high rated capacity. Furthermore, because of certain design characteristics of the prior assembly structures, the power requirements for operating same are often substantial and thus, restrict to a marked degree the extensive utilization of such equipment. Prior dasher-agitator assemblies are required to be frequently disassembled and removed from the freezer chamber in order to comply with the rigid local sanitary rules, ordinances, or laws. Such frequent disassembly and removal obviously becomes a time-consuming and oftentimes laborious operation. For this reason, therefore, size limitations as to the various component parts comprising such assemblies must be considered, when higher capacity output for a freezer is desired.

Thus, it is one of the objects of this invention to provide a freezer construction wherein frequent cleaning of the various component parts thereof in compliance with local sanitary rules, ordinances, or laws may be readily accomplished.

It is a further object of this invention to provide an improved freezer construction wherein an extremely low temperature, relatively stiff product, as well as the softer more conventional product may be readily produced.

It is a still further object of this invention to provide an improved dasher-agitator assembly construction which contributes materially to the attainment of accurate overrun control in ice cream and other frozen confections.

It is a still further object of this invention to provide an improved dasher-agitator assembly wherein the speed of operation of certain of the various parts thereof may be independently controlled.

It is a still further object of this invention to provide an improved dasher-agitator assembly wherein maintenance required therefor is at a minimum.

Further and additional objects will appear from the description, accompanying drawings, and appended claims.

In accordance with one embodiment of this invention a dasher-agitator assembly is provided for use with an elongated cylindrically-shaped freezer chamber having a product inlet at one end and a product outlet at the opposite end. The assembly includes an elongated hollow skeletal dasher member removably mounted within the freezer chamber and power driven for rotation about its longitudinal axis. Removably mounted within the hollow dasher member is an elongated agitator element having a plurality of longitudinally spaced, laterally extending beater elements. The agitator element is independently power driven for rotation within said dasher member.

For a more complete understanding of this invention reference should be made to the drawings wherein FIG. 1 is a fragmentary vertical sectional view of the freezer chamber and the dasher-agitator assembly disposed therein; said section line passing through the central longitudinal axis of the freezer chamber.

FIG. 2 is an enlarged fragmentary sectional view taken along line 2—2 of FIG. 1.

FIG. 3 is an enlarged fragmentary side elevational view of the dasher member having a portion thereof partially cut away.

FIGS. 4A and 4B are fragmentary complemental perspective views of the dasher-agitator assembly.

FIGS. 5A and 5B are fragmentary complemental enlarged perspective views of the agitator element.

FIG. 6 is a fragmentary plan view, partially in section, of a scraper blade shown assembled on the outer periphery of the dasher member.

FIG. 7 is an enlarged sectional view taken along line 7—7 of FIG. 6.

FIG. 8 is a perspective view of one of the scraper blades.

FIG. 9 is a perspective view of a modified form of agitator element.

Referring now to the drawings and more particularly to FIGS. 1 and 2, an elongated freezer chamber 10 is shown which is of a size and shape suitable for use in a freezer utilized in the commercial production of ice cream or other similar frozen confections. A freezer of the type in question is disclosed in the pending application of Alden H. Wakeman and Leon Buehler, Jr., Serial No. 319,076, filed on Oct. 25, 1963.

Freezer chamber 10, in the illustrated embodiment, includes a cylindrical sleeve 11 formed of metal or some other suitable material having a high coefficient of heat transfer. The interior surface 11a of the sleeve has a smooth, polished finish. The exterior surface 11b of the sleeve 11, on the other hand, may be grooved or finned to provide an extended heat transfer surface. The exterior surface 11b is submerged in or wetted by a suitable liquid refrigerant.

To one end of sleeve 11 is affixed an end plate 12 which is provided with a central opening 13 and a product inlet 14 radially spaced from the central opening. A second inlet 15 for air or the like, may also be provided which is spaced from both the central opening and product inlet. Both inlets are adapted to have connected thereto suitable conduits, not shown, communicating with sources of supply for the product (e.g. ice cream mix) and air.

Mounted on the opposite end of sleeve 11 is a second end plate 16 which is readily accessible and may be removed, when desired, for purposes of cleaning the chamber interior and removing the dasher-agitator assembly 17, the latter to be described more fully hereinafter. The exterior of sleeve 11, adjacent end plate 16, is supported by a wall 18 forming a part of a chamber in which is disposed the refrigerant for cooling the sleeve 11.

End plate 16 includes a central opening 19, a product discharge opening 20, and an auxiliary opening 21, the latter being substantially diametrically opposed with respect to discharge opening 20. Opening 21 is provided as an inspection port for the chamber interior. A suitable conduit 22 is connected to discharge opening 20 to permit the discharged product to be directed to a carton filler, not shown, or the like.

Removably mounted within chamber 10 is a dasher-agitator assembly 17. The assembly includes an elongated skeletal dasher member 23, which is mounted for rotation about its longitudinal axis, and an elongated agitator element 24, the latter being disposed within member 23. Dasher member 23 comprises an apertured substantially cylindrically-shaped central section 25, see FIG. 3, and a pair of apertured end plates 26 and 27, see FIG. 1, secured to opposite ends of section 25.

Arranged about the periphery of section 25 are a plurality of lugs 28 and a pair of hinge posts 30 disposed in longitudinally spaced relation on opposite sides of each lug 28, see FIG. 3. Each lug and post combination is adapted to removably accommodate an elongated scraper blade 31, see FIG. 8. Each blade is provided with an opening 32 which is adapted to accommodate a lug 28, see FIG. 6. The rear elongated side 33 of blade 31 is provided with a pair of spaced recessed portions 33a which are adapted to engage semi-cylindrical grooves 34 formed in one side of each post 30, see FIG. 7.

The leading elongated side 35 of each blade 31 is beveled to function as a scraper in removing any product which might have frozen on the interior surface 11a of the freezer chamber. It will be noted in FIGS. 3 and 7 that lug 28 is circumferentially offset with respect to the longitudinally aligned posts 30 an amount sufficient to permit the recessed rear side portions 33a to be inserted into grooves 34, and then enable the blade to be pivoted toward the outer periphery of member 23 whereupon lug 28 will be accommodated within opening 32.

In FIG. 4B, it will be noted that one group C of blades 31 extend from the end of the dasher member 23 adjacent the end plate 12 of the freezer chamber 10 to approximately mid-length of the dasher, whereas a second group D of blades 31, arranged alternately with group C, extend substantially the full length of the dasher member. A greater or lesser number of scraper blades may be utilized, if desired. By reason of having group C blades foreshortened with respect to the overall length of dasher member 23, a somewhat reduced power input is required for effecting rotation of the dasher member.

It will be noted in FIGS. 3, 4A and 4B that dasher section 25 is provided with a plurality of elongated openings 25a which enable the product, when scraped from chamber surface 11a, to find its way into the interior of the dasher member and become readily mixed with the remainder of the product passing through the chamber.

Rotary motion is imparted to dasher member 23, through a drive shaft 36 which forms a part of and extends axially from end plate 26, see FIG. 1. Shaft 36 is provided with a wear sleeve 37 which is secured to shaft 36 by a set screw 38. An O ring seal 40 is provided which is disposed within a suitable groove formed in the inner surface of sleeve 37 and prevents leakage of the product along the periphery of shaft 36. Sleeve 37 is disposed within the central opening 13 formed in the chamber end plate 12. Opening 13 is provided with an internal groove in which is disposed an O ring type seal 41.

The outer end of shaft 36 is splined 42 to accommodate a suitable coupling, not shown, leading from a separate power driving source, also not shown. The shaft 36 is supported by a suitable bearing 43 located between sleeve 37 and splined end 42.

The inner end of shaft 36 is provided with a recess 44 in which is disposed a thrust-like bearing 45. The bearing 45, in the illustrated embodiment, is held in place within recess 44 by a threaded stud 46 which extends through an axial opening formed in shaft 36. A suitable seal 47 is provided between bearing 45 and the inner end of shaft 36. Bearing 45 is adapted to accommodate one end of agitator element 24 in a manner to be described more fully hereinafter.

End plate 26 is spaced a short distance from the end face of chamber 10, see FIG. 1, and is provided with a plurality of symmetrically arranged openings 48, see FIG. 2. The openings 48 permit the product and air introduced into chamber 10 to pass into the interior of the dasher member 23.

End plate 27 is removably affixed to the opposite end of section 25 by a removable drive pin 50 and a collapsible ring 51, the latter being disposed within a suitable internal groove 52, see FIG. 3, formed in the end of section 25. An inwardly extending shoulder 53 is also formed on section 25 and is spaced from groove 52. The end plate 27, when assembled on section 25, is disposed between shoulder 53 and collapsible ring 51.

Attached to and extending axially outwardly from end plate 27 is a hollow shaft 54, see FIG. 1. Shaft 54 is fitted with a bearing sleeve 55 which passes through the central opening 19 formed in end plate 16 of chamber 10. Opening 19 is provided with an internal groove in which is disposed an O ring type of seal 56. The outer end 54a of shaft 54 is threaded to accommodate a jam nut 57. The jam nut 57 is forced against the inner race of a support bearing 58, which is provided for shaft 54, and thus said nut locks up the dasher member and agitator element between the support bearings 43 and 58.

The agitator element 24, which is disposed within the interior of dasher member 23, comprises an elongated shaft 60, see FIGS. 5A and 5B. One end 61 of shaft 60 is rounded to form a journal of reduced diameter which is adapted to be disposed within the recessed end of bearing 45, see FIGS. 1 and 5B. The opposite end 62 of shaft 60, see FIG. 1, is of reduced diameter and either splined or provided with a keyway. The shaft splined end 62 has mounted thereon a coupling 63 which, in turn, is adapted to accommodate the drive shaft 64 of a power unit 65. Unit 65 imparts rotational force to agitator element 24 wholly independent of the rotational force imparted to dasher member 23.

Adjacent splined end 62 of shaft 60 is a round section 66 which is journalled in the hollow shaft 54 of the dasher member end plate 16. An external groove is formed in shaft section 66 for accommodating an O ring seal 67. The central portion 68 of shaft 60, that is to say that portion of the shaft between end 61 and journal portion 66, has affixed to outer periphery thereof a plurality of beaters 70. In the illustrated embodiment, shaft central portion 68 has a substantially square cross-sectional shape, see FIG. 2, however, the configuration of such shaft portion may vary from that shown.

All of the beaters, except the end beaters 70A and 70B, are of like configuration, and therefore, only one of the beaters 70 will be described in detail. Each beater 70, in the illustrated embodiment, is substantially U-shaped, see FIG. 2, and has an elongated bight portion 71 affixed by welding to one facet or face of shaft portion 68. The ends or legs 72 of each beater 70 are curved outwardly from bight portion 71 and terminate short of the interior cylindrical surface 25a of dasher member central section 25, see FIG. 2. It will be noted in FIGS. 5A and 5B that successive beaters are angularly arranged relative to one another about shaft portion 68 as an axis. Thus, a substantially spiral action by the beaters occurs upon rotation of the agitator element 24.

The end beaters 70A and 70B are similar in construction and have a bight portion 71' which is substantially the same configuration as the bight portions 71 of beaters 70. The legs 72' of the end beaters, however, are substantially wider than portion 71' and have one end thereof terminating adjacent dasher member end plate 26 or 27, see FIG. 1. The shape of the end beaters and the remainder of the beaters may vary from that shown, and will depend somewhat on the type of product being treated.

It will be noted in FIGS. 5A and 5B that the longitudinal spacing between adjacent beaters becomes progressively greater upon starting from end 61 and approaching journal portion 66. Thus, by reason of this fact, greater whipping action is exerted on the product and air shortly after they are introduced into freezer chamber 10.

A modified form of agitator element 80 is shown in FIG. 9. Element 80 includes a pair of longitudinally spaced end plates 81 and 82 and a spacer plate 83 disposed intermediate plates 81 and 82. Extending longitudinally from the outer face of each end plate 81 or 82 is a shaft 84 or 85. The end of shaft 85 is adapted to be journalled in bearing 45, see FIG. 1. The other shaft 84 is adapted to extend through hollow shaft 54, see FIG. 1, and have connected to the end thereof a coupling 63, the latter in turn being connected to a drive unit 65.

Each end plate 81 and 82 is provided with a plurality of symmetrically arranged openings 86 through which the product to be whipped passes. Spacer plate 83 is provided with a center opening 87 for the same purpose.

Interconnecting the end plates and spacer plate are a plurality of symmetrically arranged elongated bars or rods 88. A greater number of bars are provided between end plate 82 and the spacer plate than between the latter and end plate 81. The reason for this is that it is desirable to impart greater whipping action to the product immediately upon the product entering the freezer chamber and thus the greater number of bars will provide the needed additional agitation. It will be noted that the bars project beyond end plate 82 and terminate adjacent the interior surfaces of the end plate 26 for dasher member 23. If desired, the bars 88 may also extend beyond the end plate 81.

The power unit 65, which imparts rotational movement to agitator element 24 is supported in an axially aligned position with respect to shaft 60 by a pair of arms 73 which extend outwardly and convergently from the removable end plate 16, disposed at one end of freezer chamber 10. Power unit 65 is preferably a hydraulic motor which is readily sensitive to speed adjustment by merely throttling the fluid input to the motor. Such hydraulic motor may be of a form readily available on the commercial market. Other forms of power units 65 may be utilized (e.g., electric motors, etc.). Normally the direction of rotation of the agitator element is opposite to that of the dasher member; however, if desired, the direction of rotation of both the member and element might be the same with the speed of rotation different. In either case, the whipping action effected by the agitator element would be substantial. The power unit 65 for the agitator element may be capable of varying the direction and speed of rotation of such element. In utilizing the improved assembly 10, the agitator element 24 may be operated, for example, at a rotational speed of 220–230 r.p.m. in one direction while the dasher member 23 is rotated in the opposite direction at a speed of 200–230 r.p.m. Thus, a substantial reduction in driving power and consequent saving in refrigeration due to the lesser heat equivalent to be removed is effected with the improved assembly, as compared to a reaction type assembly wherein the agitator elements are not separately driven. In conventional freezers the dasher frame must be rotated at a higher peripheral speed than is required for the scraping action in order to effect air incorporation and beating. By this improved invention the independently driven beater takes care of the air incorporation and beating.

By reason of the separate power sources for both the dasher member 23 and the agitator element 24, it is possible that only the agitator element 24 can be rotated while the dasher member 23 remains idle. This capability of the improved assembly is of significance with respect to cleaning the chamber interior and the dasher-agitator assembly without necessitating the removal of the assembly from the chamber. This type of cleaning is referred to in this art as "cleaning in place" or "CIP." When utilizing the CIP method, a cleaning solution is introduced into the chamber, after the freezer has been shut down and the chamber drained of the product and the product and air inlets closed. The agitator element is then run at full speed causing the cleaning solution to be subjected to violent turbulence and contact of all parts of the chamber interior and the assembly disposed therein. Following removal of the cleaning solution, the chamber interior is rinsed several times with hot water while the agitator element is rotating at full speed. The cleaning solution and water introductions may be repeated as many times as necessary in order to comply with the local legal sanitary requirements.

By causing the dasher member 23 to remain idle during such cleaning operation, no scoring of the chamber surface 11a by the scraper blades 31 occurs, and a substantial savings in power consumption in operating the equipment is effected. Thus, by necessitating the dasher-agitator assembly to be removed only infrequently in order to sharpen the scraper blades, or to make certain other adjustments or replacements of the assembly parts, the cost, manual labor, and time involved in cleaning the interior of the freezer chamber is at a minimum as compared to other types of continuous ice cream freezers.

Thus, it will be seen that a dasher-agitator assembly has been provided which is simple, yet sturdy, in construction, and permits accurate independent rotational control of both the dasher member and agitator element to effect controlled overrun in the discharged product. Furthermore, a CIP method may be readily utilized with the improved assembly construction and thus avoiding the need for frequent disassembly and removal of the dasher-agitator assembly from the freezer chamber.

While several embodiments of this invention have been described above, further modifications may be made thereto and it is contemplated, therefore, by the appended claims, to cover any such modifications as fall within the true spirit and scope of this invention.

We claim:

1. A device of the class described for use with a continuous type ice cream freezer having an elongated cylindrically-shaped freezer chamber, comprising an elongated hollow skeletal dasher member positionable within such freezer chamber and power driven for rotation about its longitudinal axis; said dasher member including an apertured cylindrical sleeve, a plurality of scraper means removably mounted on the exterior surface of said sleeve for contacting the interior surface of such freezer chamber, an apertured first end plate affixed to one end of said sleeve and having an elongated shaft extending transversely from the outer surface of said end plate, means provided at the distal end of said shaft for effecting rotation of said dasher member, and an apertured second end plate removably mounted on the opposite end of said sleeve and having an elongated hollow shaft extending transversely from the outer surface of said second end plate; and an elongated agitator element removably mounted within the dasher element and independently power drive for rotation within said dasher member; said agitator element having an elongated shaft means, one end of which is supported by the shaft extending from said first end plate, and the other end of which extends through the hollow shaft extending from said second end plate, and means provided at said agitator element shaft other end for effecting rotation of said agitator element independently of said dasher member.

2. The agitator element recited in claim 1 including a plurality of longitudinally spaced, laterally extending beater elements mounted on the periphery of said shaft means intermediate the ends thereof, the longitudinal spacing between said beater elements becoming progressively less upon approaching said one end of said shaft.

3. The agitator element recited in claim 2 wherein said beater elements are angularly disposed relative to one another about the longitudinal axis of said shaft means as an axis.

4. The agitator element recited in claim 3 wherein each of said beater elements is substantially U-shaped and has a bight portion affixed to the periphery of said shaft means.

5. A device of the class described for use with a continuous type ice cream freezer having an elongated cylindrically-shaped freezer chamber, provided with a product inlet and a product outlet, said device comprising an elongated hollow skeletal dasher member positionable within such freezer chamber and power driven for rotation about its longitudinal axis, a plurality of scraper elements mounted on the periphery of said dasher member for contacting the interior surface of such freezer chamber, a greater number of scraper elements being disposed on the end portion of said dasher member positionable adjacent the product inlet than the end portion of said dasher member positionable adjacent the product outlet, and an elongated agitator element removably mounted within said dasher member and independently power driven for rotation within said hollow dasher member; said agitator element being provided with a plurality of longitudinally spaced, laterally extending beater elements, the longitudinal spacing between adjacent beater elements being closer at the end portion of said agitator element positionable adjacent the product inlet than at the end portion of said agitator element positionable adjacent the product outlet.

6. A freezer for ice cream and the like comprising a refrigerated elongated cylindrical chamber, a product inlet at one end of said chamber, a product outlet at the opposite end of said chamber, an elongated hollow skeletal dasher member removably mounted within said chamber and power driven for selective rotation about the longitudinal axis of said chamber, scraper means mounted on the exterior surface of said dasher member for contacting the cylindrical interior surface of said chamber to prevent accumulation of a frozen product layer on said chamber surface, an elongated agitator element removably mounted within said dasher member and power driven for independent rotation within said hollow dasher member, and adjustable means operatively connected to said dasher member and said agitator element whereby the latter, when said means is in one position of adjustment, is selectively rotatable while said dasher member is stationary; said agitator element including a plurality of longitudinally spaced laterally extending beater elements, each of said beater elements being angularly disposed relative to one another about the longitudinal axis of said agitator element as an axis; the longitudinal spacing between adjacent beater elements being closer at the end portion of said agitator element adjacent said product inlet than at the agitator element end portion adjacent said product outlet.

7. The freezer recited in claim 6 wherein a greater number of scraper means are mounted on the peripheral portion of said dasher member adjacent said product inlet than on the peripheral portion of said dasher member adjacent said product outlet.

8. An agitator element for use in an ice cream freezer comprising a pair of apertured end members arranged in axially aligned relation, an apertured spacer member disposed intermediate said end members and axially aligned therewith, a plurality of symmetrically arranged, substantially parallel, elongated beater elements interconnecting said end and spacer members, the number of beater elements interconnecting one of said end members with said spacer member being greater than the number of beater elements interconnecting the other of said end members with said spacer member, and means affixed to one end member for effecting rotation of said agitator element.

References Cited by the Examiner

UNITED STATES PATENTS

| 1,512,665 | 10/24 | Bagby | 259—105 |
| 2,059,485 | 11/36 | Payne et al. | 259—10 |
| 2,289,613 | 7/42 | Weinreich | 259—105 |
| 2,735,276 | 2/56 | Thompson. | |

WALTER A. SCHEEL, *Primary Examiner.*

CHARLES A. WILLMUTH, *Examiner.*